(12) United States Patent
Andreason

(10) Patent No.: US 6,873,697 B2
(45) Date of Patent: Mar. 29, 2005

(54) METHOD AND APPARATUS FOR HANDLING TELECOMMUNICATIONS CONNECTIONS

(75) Inventor: Tomas Andreason, Tyresö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 214 days.

(21) Appl. No.: 10/048,715

(22) PCT Filed: Feb. 21, 2001

(86) PCT No.: PCT/SE01/00383
§ 371 (c)(1),
(2), (4) Date: Feb. 5, 2003

(87) PCT Pub. No.: WO02/067561
PCT Pub. Date: Aug. 29, 2002

(65) Prior Publication Data
US 2003/0152209 A1 Aug. 14, 2003

Related U.S. Application Data

(63) Continuation-in-part of application No. 09/265,954, filed on Mar. 11, 1999, now abandoned.

(30) Foreign Application Priority Data

Mar. 2, 1999 (SE) ................................ 9900747
Mar. 2, 1999 (SE) ................................ 9900760

(51) Int. Cl.[7] .............................. H04M 3/42; H04M 3/54
(52) U.S. Cl. .............................. 379/211.01; 379/211.02
(58) Field of Search ................... 379/201.01, 201.02, 379/207.02, 211.01, 211.02, 212.01

(56) References Cited

U.S. PATENT DOCUMENTS 5,509,062 A * 4/1996 Carlsen .................. 379/211.02
5,550,907 A * 8/1996 Carlsen .................. 379/211.02
5,870,465 A    2/1999 Hosbach et al.
5,943,411 A * 8/1999 Houck et al. ................ 379/219
6,614,897 B1 * 9/2003 Curtis et al. ........... 379/210.01

FOREIGN PATENT DOCUMENTS

| DE | 199 14 744 A1 | 10/2000 |
|---|---|---|
| EP | 0 959 593 A2 | 11/1999 |
| GB | 2 287 610 A | 9/1995 |
| WO | 97/18662 A1 | 5/1997 |
| WO | 97/38518 A2 | 10/1997 |
| WO | 98/01985 A1 | 1/1998 |
| WO | 98/10573 A2 | 3/1998 |
| WO | 98/24224 A1 | 6/1998 |
| WO | 00/52908 A2 | 9/2000 |

OTHER PUBLICATIONS

International Search Report dated Sep. 26, 2001.

* cited by examiner

Primary Examiner—Harry S. Hong

(57) ABSTRACT

The present invention relates to a telecommunications exchange (1) and a method for handling call diversions such that emergence of so-called trombone connections is avoided. According to the inventive telecommunications exchange (1) and method, trombone connections are avoided by means of changing a diversion of calls placed to a first extension number (No(V)) in the exchange, from being diverted to a second remote extension number (No (A)), which is used to set up a data connection (15), to instead be diverted to a predetermined third extension number (No(S)). An advantage of the present invention is that connections that previously unnecessarily used three trunk channels, by means of the invention instead are set up on a single trunk channel. Thereby available trunk resources are utilized more efficiently in a telecommunications system.

24 Claims, 4 Drawing Sheets

METHOD AND APPARATUS FOR HANDLING TELECOMMUNICATIONS CONNECTIONS

This application is a continuation-in-part of U.S. patent application Ser. No. 09/265,954 to Tomas Andreason filed on Mar. 11, 1999 now abandoned, the entire contents of which are herein expressly incorporated by reference.

FIELD OF THE INVENTION

The present invention relates to handling of telecommunications connections in general and in particular to handling of call diversions.

BACKGROUND

Today more and more people use the possibility to connect their home computer to the employer's intranet to be able to work from home. The companies often provide their employees with a possibility to connect to the company's intranet via the company's Private Branch Exchange (PBX). The connection is generally established by means of the employee calling the exchange, using his home computer and a modem, and then after a successful identity check, the user is permitted access to the intranet, and a data connection is set up between the user's computer and the intranet, through the exchange.

The international application WO98/44701 describes a device and a method for connecting a computer to a data network via an exchange. The exchange is equipped with a network connection device that sets up the connection between the computer and the data network. At the establishment of the connection, a network address, belonging to the network connection device, is associated with the computer, or more exactly with the telecommunications connection to which the computer is connected.

In order to make it possible for a person with a single telephone line, to have his computer connected to a data network, via the telecommunications network, and at the same time utilize the service telephony, a number of technologies have been developed. An example of such a technology is IP-telephony, wherein speech signals are sent over the data connection in packets, which follow the IP (Internet Protocol) protocol standard. IP-telephony may be performed by means of a so-called IP-telephone or by means a computer provided with an IP-telephony application. An exchange that supports both normal telephony and IP-telephony generally has special telephone numbers for IP-telephony (hereafter called IP-telephony numbers), which are used when setting up IP-telephony phone calls. The IP-telephony number is a normal extension number that is associated with an IP-address (and possibly also with a port number) that has been assigned to a session of an IP-telephone or an IP-telephony application of a computer. The association is made when the session is activated. When an IP-telephony number is called the call will thus be directed to a certain IP-address rather than to a fixed telecommunications line as is the case when a normal telephone number is called. The exchange will further know that a call placed to the IP-telephony number is to be forwarded to an endpoint in IP-packets, instead of as a normal call in time slots. The IP-telephone or the IP-telephony application may be connected to the company exchange through a dial-up connection, e.g. a PPP connection.

In a variant of IP-telephony the exchange is provided with a special telephony server. A user who is connected to a computer network by dial-up may divert calls placed to his own telephone number so that they are directed to the telephony server instead of to his telephone. The call diversion is usually activated from the user's telephone before he connects to the computer network. The telephony server is able to convert time slot speech information into IP-packets and send these to the user's computer over the existing data connection. The user will then use the computer instead of an ordinary telephone to place and receive telephone calls while he has his computer connected to the data network. The computer will, for this purpose, have to be provided with a telephony application, which inter alia handles communication with the telephony server. The telephony server stores information regarding which diverted telephone number is to be associated with which data connection so that calls that are diverted to the telephony server reach the right user.

The international patent applications WO 97/18622 and WO 98/10573 both describe techniques for a user who is connected to a data network to use the service telephony on the same telecommunications line that is used for the data connection.

When a user has connected his computer to the data network, as described above, via the telephone network, and at the same time has made arrangements to use one of the techniques described above to be able to place and receive phone calls on the same telecommunications line that is used for the data connection, so-called "trombone" connections often arise. In a trombone connection several trunk channels are used unnecessarily to set up a connection that could be set up with a single trunk connection. A trombone connection may for instance arise when a user who is working at home and for that reason has diverted calls placed to his office telephone number, which is an extension number in the exchange, to his home telephone number, in order to be able to receive his office phone calls at home. However, when the user connects his computer to the office data network, through his single telephone line, via the exchange, a call that is placed to the home phone number will meet a busy tone, unless the user has diverted his telephone and activated one of the services for receiving phone calls while he is connected to the data network. When the user has performed the necessary steps for using such a service for receiving phone calls over the data connection, calls to his home phone number will be diverted to e.g. an IP-telephony number in the exchange or a number of a telephony server of the exchange. With this arrangement a call that is placed to the user's office telephone number in the exchange will first be diverted and routed over a first trunk channel to a local exchange that has the user's home telephone number as one of its extension numbers. The local exchange holds the information that the user's home telephone number is in turn diverted to the IP-telephony or telephony server phone number in the exchange, so that the call then is routed back to the exchange over a second trunk channel. In the exchange, the call is converted into packets and then again redirected and sent over the data connection in use, in a third trunk channel already occupied by the data connection, back to the user's local exchange and then to the user's home. This is obviously an undesirable type of connection and an inefficient use of available trunk channels.

SUMMARY OF THE INVENTION

The present invention solves the problem of avoiding the emergence of the undesirable trombone connections described above.

An object of the present invention is thus to provide a telecommunications solution in which trombone connections are avoided.

The present invention solves the above stated problem by means of a telecommunications exchange as stated in claim 1 and by means of a method as stated in claim 13.

According to the inventive telecommunications exchange and method, trombone connections are avoided by means of changing the diversion of calls placed to a first extension number in the exchange, from being diverted to a remote second extension number, which is used to set up a data connection, to instead be diverted to a predetermined third extension number.

When a telephone line associated with the remote second extension number is engaged for establishing a data connection, the diversion of calls directly to this second extension number is pointless since such calls will meet a busy tone or cause a trombone connection. The present invention therefore provides means for checking for such pointless diversions and for changing them to be diverted directly to the predetermined third extension number instead, thereby avoiding a possible emergence of a trombone connection. According to embodiments of the present invention the third extension number may particularly be a mobile phone number, an IP-telephony number in the exchange or a number associated with a telephony server of the exchange.

An advantage of the present invention is that connections that previously unnecessarily used three trunk channels, by means of the invention instead are set up on a single trunk channel. Thereby available trunk resources are utilized more efficiently in a telecommunications system. The reduction of utilized trunk channels in the telephone network also means that telephone charges involved in the setting up of the two unnecessary trunk channels are saved. This means a reduction in costs for a company or person who is a subscriber of telephone network services.

Another advantage of an embodiment of the present invention is that the change of the call diversion only is made when and during the time that it is desirable, i.e. as long as the data connection exists. If for instance the second remote phone number is an ordinary fixed telephone number and the third extension number is a number of a mobile phone, calls to the first extension number will only be diverted to the mobile phone for the period of time that the telecommunications line, associated with the fixed telephone number, is occupied with a data connection. According to the embodiment of the present invention, the calls to the first extension number are again diverted to the fixed telephone number, as soon as the data connection is cleared. Since a telephone call to a mobile phone generally is more expensive today than a call to a fixed telephone, call expenses can be kept at a minimum according to the embodiment of the present invention, since calls are set up to the mobile phone only when it is not possible to set up calls to the fixed telephone.

Yet another advantage of an embodiment of the present invention is that it is user friendly, since it is flexible and automatic. According to an embodiment of the present invention the user may choose the third extension number that is used according to his preferences. He may for instance prefer to take a call as a mobile phone call rather than as an IP-telephony call and the user may then set the third extension number to be his mobile telephone number rather than his IP-telephony number. He will thereafter not have to think about making changes to his call diversion of the first extension number when he connects his computer to the data network via the exchange, since the exchange according to the invention, is provided with means for automatically changing this diversion to the predetermined third extension number.

The present invention will now be described in more detail by means of preferred embodiments and with reference to the accompanying drawings.

DETAILED DESCRIPTION

Figure 1:
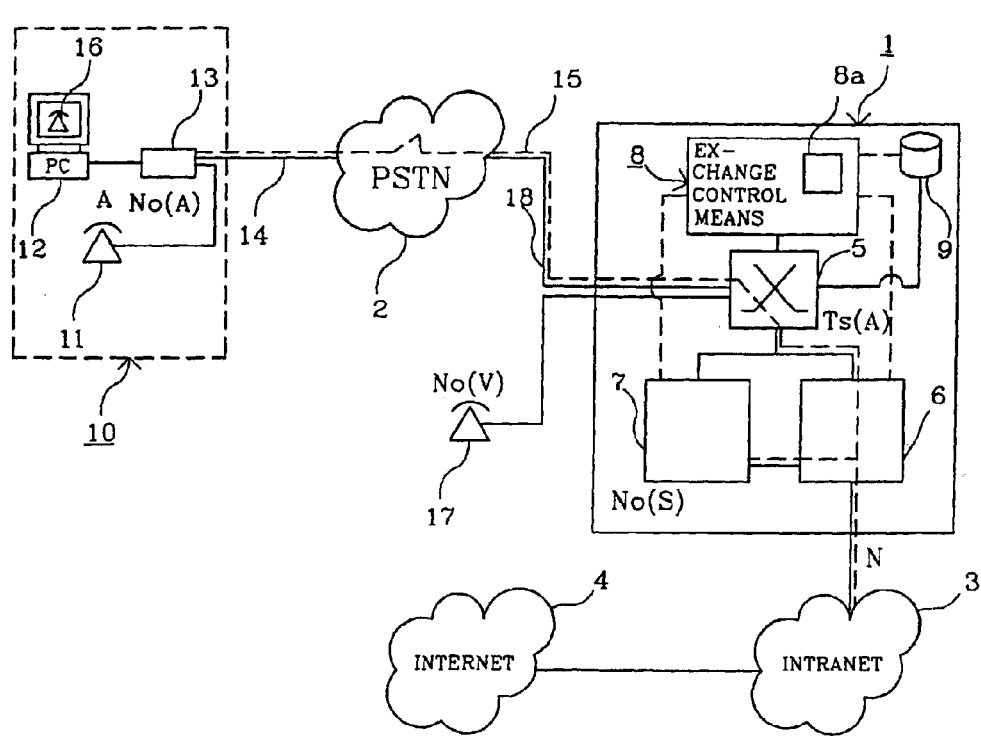
FIG. 1 is a schematic block diagram of telecommunications system suitable for implementation of the present invention.

FIG. 1 shows a telecommunications system, wherein a user A can connect his personal computer 12 to a data network 3 via an exchange 1 and still be able to utilize the service telephony thanks to a technique that involves a telephony server 7 in the exchange 1, as mentioned above. The exchange 1 is connected between a public telecommunications network 2 (PSTN) and a data network 3, here in the form of a so-called intranet. The intranet 3 is in turn connected to another data network in the form of the Internet. The exchange 1 includes a switch core 5 that is connected to the telecommunications network 2 and a network connection device 6, which is connected between the switch core 5 and the intranet 3. The telephony server 7 is connected to the switch core 5 and the network connection device 6. The telephony server 7 may optionally also be connected to the intranet 3. An exchange control means 8 is connected to the switch core 5, the network connection device 6 and the telephony server 7. The exchange control means 8 is arranged to be able to set call diversions such that calls to one extension number in the exchange is diverted to another extension number inside or outside the exchange. Information regarding such call diversions may be stored in memory 8a in the exchange control means or in a database 9 that is accessible to the exchange control means.

The user A has, at a remote location 10, a telephone 11 and the personal computer 12 connected to the telecommunications network 2 via a modem 13 and a subscriber line 14. By means of the personal computer 12 and the modem 13, it is possible for the user A to establish a data connection 15 with the intranet 3 and possibly also with the Internet 4 via the exchange 1. It is possible to activate a telephony application 16 on the personal computer 12. A telephone 17 is directly connected to the exchange 1 and is allocated the first extension number No(V). The intranet 3 can be implemented in some local network such as a LAN (Local Area Network) of the type Ethernet or Token Ring.

The connection between the telephone network 2 and the switch core 5 is preferably a telecommunications line 18 over which digital telecommunications signals are transported in the form of PCM signals in frames and time slots according to techniques known to a person skilled in the art.

Figure 2:
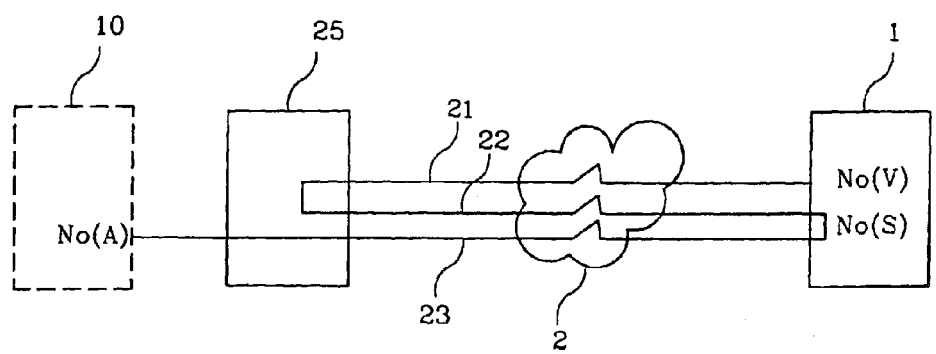
FIG. 2 is a schematic block diagram illustrating a so-called trombone connection.
Figure 3:
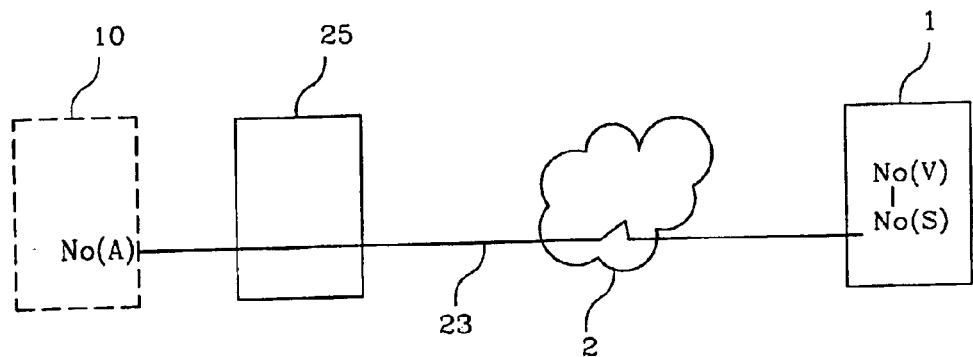
FIG. 3 is a schematic block diagram illustrating how the trombone connection of FIG. 2 is avoided, according the present invention.
Figure 4:
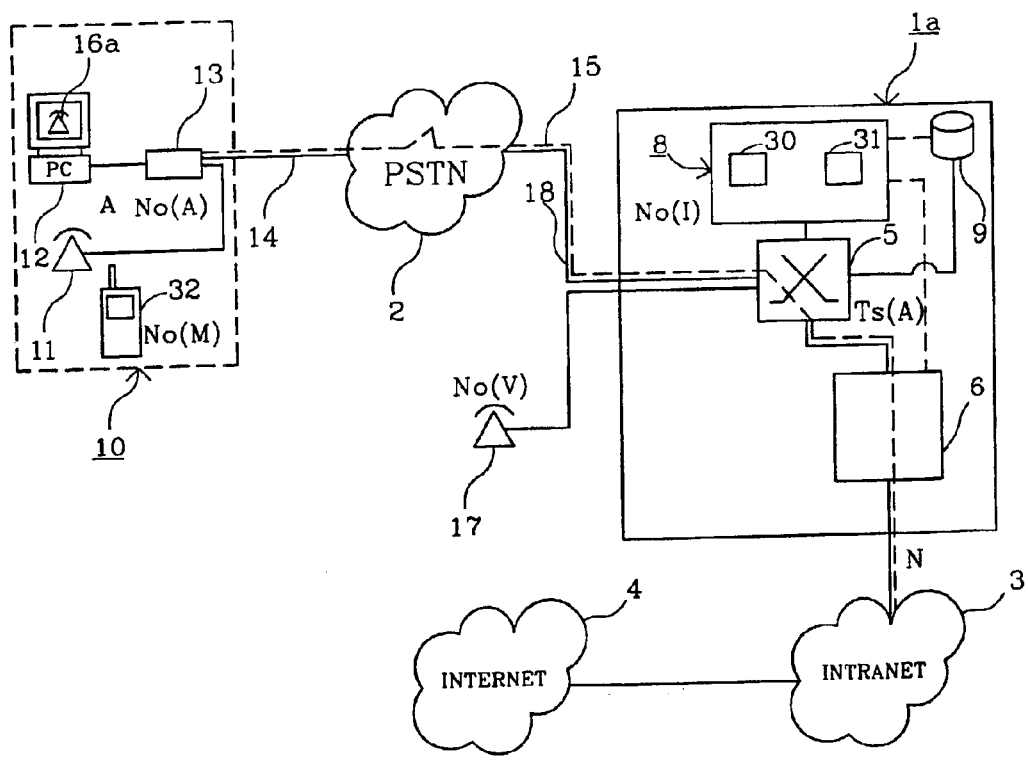
FIG. 4 is a schematic block diagram of a telecommunications system including an alternative embodiment of a telecommunications exchange according to the present invention.

Please note that FIG. 1, as well as FIGS. 2–4, are schematic illustrations in which several common and well known features of the telecommunications exchange, such as line cards and backplane, have been omitted in order to provide a clear and simple illustration of the features that are relevant for the present invention.

It is further to be noted that exchanges may employ varying means and methods for controlling telephones and other units using the exchange. Such means and methods may for instance be means and methods for call supervision, number analysis, monitoring extension states and controlling physical or low level addresses of associated extensions. These means and methods are well known to a person skilled in the art and will not be discussed here in further detail. In FIG. 1 the exchange 1 is shown as a single physical unit with its elements physically located together. It is today possible to build exchanges that are physically distributed between several locations. It is for instance possible that the database 9 or the network connection device 6 is located at a telecommunications node that is remote from a node in which the exchange control means is located. The exchange control means 8 may then have to communicate with the database 9 or the network connection device 6 through a telecommunications network. The basic functioning of the exchange will however be the same irrespective of whether the elements of the exchange are physically distributed or not. The term exchange is here intended to cover all types of implementations of an exchange, whether distributed or not.

Another alternative arrangement of an exchange that the invention covers is that the exchange does not include a network connection device of its own, but instead communicates with another party's network connection device, via a telecommunications network. The other party's network connection device may have its own connection to the PSTN, and the data connection 15 that is set up from the extension number No(A) to the other party's network connection device need not pass through the exchange 1. It is thus according to the invention not important where a device such as the network connection device is located. What is important to the invention is instead the function of each unit and how they work together, whether this is achieved by the units being directly connected to each other or indirectly via a network.

The exchange 1 provides the user A with the possibility to connect his personal computer 12 to the intranet and at the same time receive or make phone calls via the same subscriber line 14 as is used for the data connection 15. It is assumed in the example that the telephone 11 is the user's A home telephone, the personal computer is the user's home computer and the telephone 17 is the user's A office telephone. The user's A subscriber line 14 is associated with the second extension number No(A), which thus is the number that should be called in order for the home telephone 11 to ring. It is further assumed that the user A wants to work at home and therefore wishes to receive calls placed to the first extension number No(V), i.e. calls to the office telephone 17, at his home, i.e. at remote location 10. For this purpose the user A has diverted calls to the first extension number No(V) to the second extension number No(A). Techniques for call diversion are well known to a person skilled in the prior art and will therefore not be explained further herein. Now assume that the user in addition wants to have his personal computer 12 connected to the intranet 3 and simultaneously, by means of the technique mentioned involving the telephony server 7, have the possibility to receive and make phone calls. The establishment of the data connection 15 between the personal computer and the intranet 3 is handled by the network connection device 6. At the establishment of the data connection, a network address N, e.g. an IP-address, is associated with the personal computer 12. In order to be able to receive and make phone calls while connected to the intranet 3, the user A has to activate the telephony application 16. The user will in most cases, by means of his telephone, have diverted the second extension number No(A) to a third extension number No(S) associated with the telephony server 7, before activation of the telephony application. Thereby an incoming call to the first extension number No(V) will be directed first to the second extension number No(A) and then to the third extension number No(S) where it will be received by the telephony server. The telephony server 7 communicates with the telephony application 16 over the established data connection 15 and informs, by means of this connection, the user of the incoming call through a message on the user's personal computer 12. If the user chooses to take the call, the telephony server 7 arranges for speech information to be sent as IP-packets over the established data connection 15. The user employs the telephony application 16 and the computer's equipment, such as sound cards, speakers and microphone, in order to communicate.

The incoming call to the first extension number No(V), described above, will give rise to a so-called trombone connection, which is illustrated schematically in FIG. 2. The trombone connection involves three trunk channels, set up between the exchange 1 and a local exchange 25, which is the local exchange to which the remote location 10, i.e. the user's home, is connected. The trunk channels will be set up through the telecommunications network 2 to which the exchange 1 and the local exchange 25 are connected. A first trunk channel 21 is set up when the incoming call is diverted to the second extension number No(A). Calls to the second extension number No(A) are diverted, in the local exchange 25, to the third extension number No(S), which gives rise to a second trunk channel 22. As mentioned time slot speech information will then be converted into IP-packets in the telephony server and sent over the data connection 15, which makes use of a third trunk channel 23. The first, second and third trunk channels, 21, 22, 23 can be seen to form a connection with a trombone-like shape. This type of trombone connection can be avoided by means of the present invention.

According to the present invention the exchange is arranged to check if calls placed to the first extension number No(V) are diverted to the second extension number No(A), from which the connection to the intranet 3 is initiated. The second extension number No(A) will become known to the network connection device during the set-up phase of the data connection. The second extension number No(A) may e.g. be provided by known signaling mechanisms in the PSTN as calling line identification information. The check for a diversion of calls to the second extension number No(A) is for instance performed in connection with the set up of the data connection 15. If calls placed to the first extension number No(V) are diverted to the second extension number No(A), the exchange is, according to the present invention, arranged to change the diversion from the second extension number No(A) to another predetermined extension number, in the example described above to e.g. the third extension number No(S). By means of the present invention an incoming call to the first extension number No(V) would result in a connection, as shown in FIG. 3. The connection shown in FIG. 3 includes only the third trunk channel 23, which can be compared with the trombone connection shown in FIG. 2, which includes three trunk channels 21, 22, 23. The invention will thus provide simpler and more direct connections. In the example will the invention make sure that calls to the first extension number No(V) are diverted directly to the third extension number, No(S) instead of via the second extension number No(A). To divert calls to the second extension number No(A) is pointless after the subscriber line 14 is made busy with the data connection 15, since the diverted call either will meet a busy tone or will be diverted again. An exchange 1 according to the present invention is arranged to look for such pointless diversions and change them, thereby avoiding trombone like connections as shown in FIG. 2.

The inventive exchange will have to be provided with means for checking if calls placed to the first extension number No(V) are diverted to the second extension number No(A), from which the data connection 15 is initiated. The inventive exchange will further have to have means for changing the diversion, if it exists, from the second extension number No(A) to the predetermined third extension number. These checking means 30 and changing means 31 are preferably implemented in software in the exchange control means 8, as illustrated symbolically in FIG. 4. Since a call diversion will appear as stored information in memory in the exchange control means 8 or in the database 9, the checking means 30 will preferably be program code means that allows for reading call diversion information and comparing it with the information on the second extension number No(A), which is obtained during the set-up of the data connection 15. The changing means 31 will preferably be program code means that allows for a possibility to overwrite a selected portion of the present call diversion information with new predetermined information. The previous call diversion information is preferably saved in order to allow for restore of the call diversion after the data connection is cleared.

The checking means 30 may be arranged to check for a diversion to be changed in many different ways. In the example above it was mentioned that the checking means checked if the first extension number No(V) was diverted to the second extension number No(A). In the above example the first extension number No(V) is the user's A office phone number. The user A will generally have to identify himself when he requests set-up of the data connection 15 to the intranet 3. The exchange will generally also keep user profiles that contain user information such as which extension numbers in the exchange are associated with which user. The checking means 30 may receive information regarding the user's A identity from network connection device 6 after the set-up of the data connection 15. The checking means may further be arranged to then read the user's A user profile to find that the first extension number No(V) is the extension number in the exchange that is associated with the user A. The checking means 30 then checks if calls to the first extension number No(V), which was found in the user's A user profile, are diverted to the extension number with which the data connection 15 is set-up. If several extension numbers in the exchange are associated with the user A, the checking means may be arranged to check for call diversions associated with all or some of these extension numbers. And the changing means may then have to change more than one call diversion.

An alternative embodiment of the checking means 30 is to implement it such that it checks if calls to any of the extension numbers of the exchange are diverted to the second extension number No(A) to which the data connection 14 is set-up and then have the changing means change all such diversions. It may however be inefficient to have the checking means check all the extension numbers of the exchange when the number of extension numbers of the exchange is large.

In the example above the predetermined third extension number, to which the call diversion is to be changed, was the extension number No(S) associated with the telephony server 7. This predetermined third extension number may however be another number. The exchange 1a shown in FIG. 4 does not include a telephony server. The exchange 1a is arranged to provide the IP-telephony variant in which special IP-telephony numbers are used, as mentioned above, instead of the variant in which the telephony is used. An IP-telephony number No(I) in the exchange 1a is associated with the user A. The user A may receive IP-telephony calls via the data connection 15 by means of activating an IP-telephony application 16a on the personal computer 12, which then informs the exchange that the network address N that is used for the data connection 15 is to be associated with the IP-telephony number No(I). In this case it is probably desirable to let the predetermined third extension number be the IP-telephony number No(I). Thereby will the changing means change a diversion of calls placed to the first extension number No(V) to be diverted to the IP-telephone number No(I) instead of to the second extension number No(A), when the data connection 15 is set up.

Another alternative is to let the predetermined third extension number be a mobile phone number No(M) of a mobile phone 32 of the user A, as illustrated in FIG. 4. Since the speech quality of IP-telephony often can be poor the user A may prefer to receive phone calls on his mobile phone 32 for the period of time that the data connection exists and his fixed telephone 11 can not be used. It is also possible that the exchange does not support IP-telephony. The invention with the predetermined third extension number set to the mobile phone number No(M) will then provide the user A with the possibility to receive phone calls directed to the first or second extension number No(V), No(A) on his mobile phone number No(M) while the data connection 15 is set up. The user will usually have to manually activate and deactivate diversion of calls directed to the second extension number No(A) such that the calls are directed to the mobile phone number No(M) instead. However if the user has diverted calls placed to the first extension number No(V) to instead be directed to the second extension No(A) the invention saves him the trouble of changing this call diversion to the mobile phone number No(M) when the data connection is set up. The network connection device is preferably arranged to inform the checking means and/or changing means when the data connection is set up and when the data connection is cleared. That way can the changing means change a call diversion to the predetermined third extension number when the data connection is being set-up and then reset the call diversion when the data connection is cleared. If calls to the first extension number No(V) first are directed to the second extension number No(A) and the predetermined third extension number is the mobile phone number No(M), calls to No(V) would, by means of the above mentioned embodiment of the invention, automatically be directed to the second extension number No(A) when no data connection 15 exists and directly to the mobile phone number No(M) when the data connection 15 is set-up. The switch in the call diversion would occur automatically without the user A having to think about it.

Since a call to a mobile phone generally is more expensive than a call to a fixed telephone the invention is provides for a cost efficient solution since calls only are diverted to the mobile phone 32 during the time when the fixed telephone 11 can not be used. Without the invention the user A may instead choose to always have calls placed to the first extension number No(V) directed to the mobile phone number No(M) when he is working at home, which could be more expensive than to use the invention which allows for selective diversion to the mobile phone 32.

It was mentioned above that the network connection device preferably is arranged to inform the checking means and/or changing means when the data connection is set up and when the data connection is cleared. An alternative arrangement is to in addition have the checking means ask the network connection device, at regular intervals, if the data connection still exists. This may advantageous if the normal information that the data connection 15 was cleared was somehow lost, for example due to an error in the transfer of information between the network connection device and the checking means. A changed diversion that is no longer appropriate may then be corrected.

It is possible to let the user A communicate with the exchange 1, 1a to decide which number is to be used as the predetermined third extension number. The user A may then choose the third predetermined extension number according to his preferences. The information regarding the chosen predetermined third extension number can be stored in the user's A user profile in the exchange.

In connection with the description of embodiments of the present invention above, it was mentioned that the check for a diversion of calls to the second extension number No(A) preferably was performed in connection with the set-up phase of the data connection. An alternative embodiment is to arrange the checking means and changing means to perform a change of the call diversion only when a call that is to be redirected to No(A) arrives. Thus if no call that is to be redirected to No(A) arrives, no change of call diversion to the predetermined third extension number is performed.

In connection with the description of FIGS. 1 and 3, variants of so called IP-telephony were described, that could provide the user A with the possibility to receive and place phone calls while his subscriber line was busy with a data connection 15. In order to use these variants of IP-telephony the user has to activate an application 16, 16a on his computer. The application will perform the communication with the exchange 1 that is necessary in order to activate the respective IP-telephony service. The user who has established a data connection 15 may or may not choose to activate the application 16 or 16a. If the application 16, 16a is activated it is probably desirable to use the present invention and let the mentioned predetermined third extension number be the telephony server number No(S) or the IP-telephony number No(I). However if none of the IP-telephony variants are activated it may e.g. be desirable to let the third predetermined extension number be the mobile phone number No(M). This can be achieved in an embodiment of the present invention by arranging the checking means to perform a first check when the data connection 15 is set up and to order the changing means to change a possible diversion of calls to the second extension number No(A) to instead be diverted to the mobile phone number No(M). If the exchange later receives information from the computer 12 that the application 16 or 16a is activated the checking means may be arranged to perform a second check to see if any changes of call diversions have been performed and, in that case, order the changing means to change these diversions again so that calls are diverted to the telephony server number No(S) or the IP-telephony number No(I), instead of to the mobile phone number No(M). The exchange may be arranged to always perform the second check (and possible associated change) upon activation of the application 16, 16a, or it may be arranged to perform the second check depending on settings relating to the particular application being activated. Setting information regarding which applications are to give rise to the second check upon activation may be stored in the exchange or in the application to be communicated to the exchange.

Figure 5:
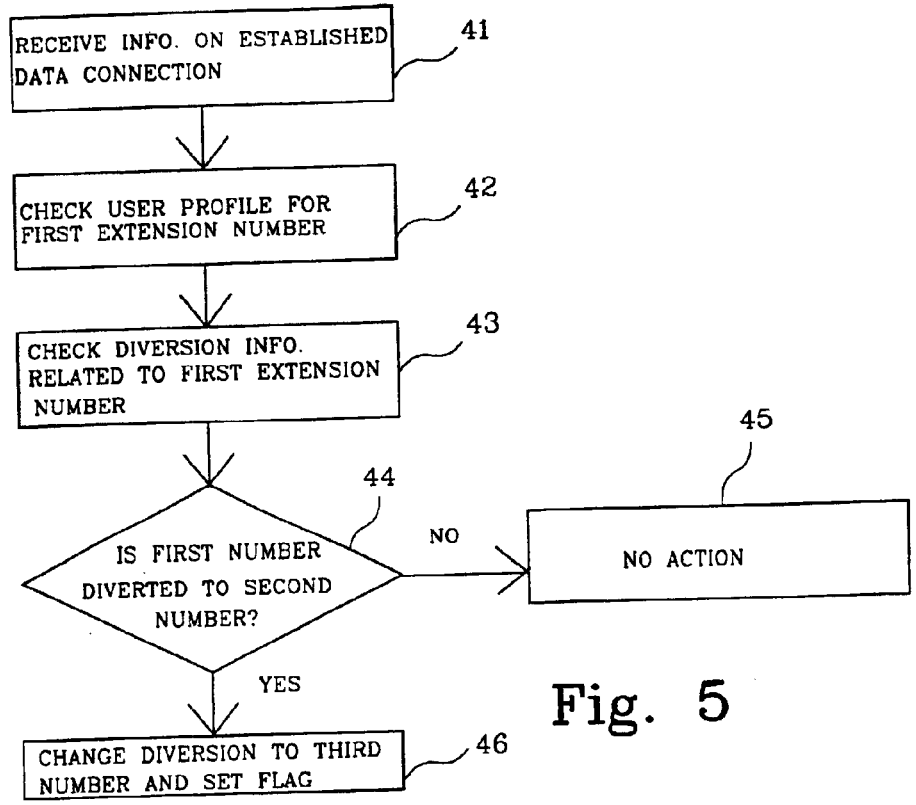
FIG. 5 is a flow diagram of an embodiment of a method for handling of call diversions according to the present invention.
Figure 6:
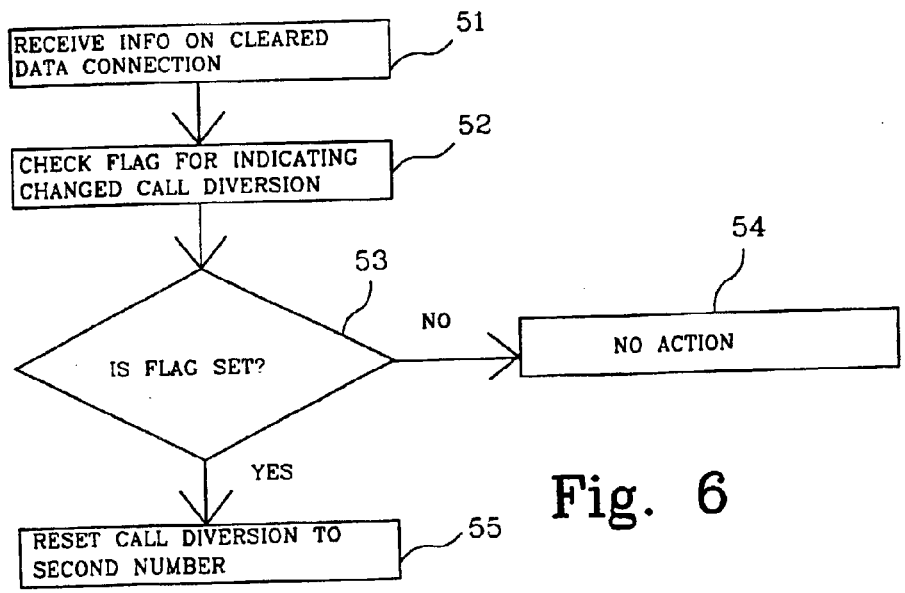
FIG. 6 is a flow diagram of a part of a method according to the present invention.

An embodiment of a method according to the present invention is illustrated in FIG. 5 and FIG. 6. In this embodiment will a call diversion be changed to the predetermined third extension number only during the period of time that the data connection 15 exists, as described above. When the data connection 15 is set up will the network connection device inform the checking means 30 of the fact that the connection has been set up, the identity of the user A for which the data connection was set up and the second extension number No(A) with which the data connection was set up, step 41. The checking means will then, in a step 42, check the user profile of the user A to find the first extension number No(V) or numbers of the exchange that are associated with the user A. Thereafter will the checking means read the call diversion information related to the first extension number(s). If there exists a call diversion so that calls to the first extension number are diverted to the second extension number, step 44, the method continues with a step 46, otherwise the method continues with a step 45. In the step 45 is no action performed. In the step 46 on the other hand, the changing means 31 changes the call diversion information so that the calls placed to the first extension number No(V), which previously were diverted to the second extension number No(A), now are diverted to the predetermined third extension number instead. It may also be advantageous to set a flag to indicate that the call diversion has been changed, so that the procedure to restore the call diversion when the data connection is cleared becomes simple. When the data connection is cleared the network connection device 6 informs the checking means, step 51. The checking means then checks the flag to see if a call diversion was changed when the data connection was set up, step 52. If this was the case, step 53, the changed call diversion is reset so that calls to the first extension number No(V) again are diverted to the second extension number No(A), step 55. If no call diversion was changed when the data connection was set up, no reset action is performed when the data connection is cleared, step 54.

Figure 7:
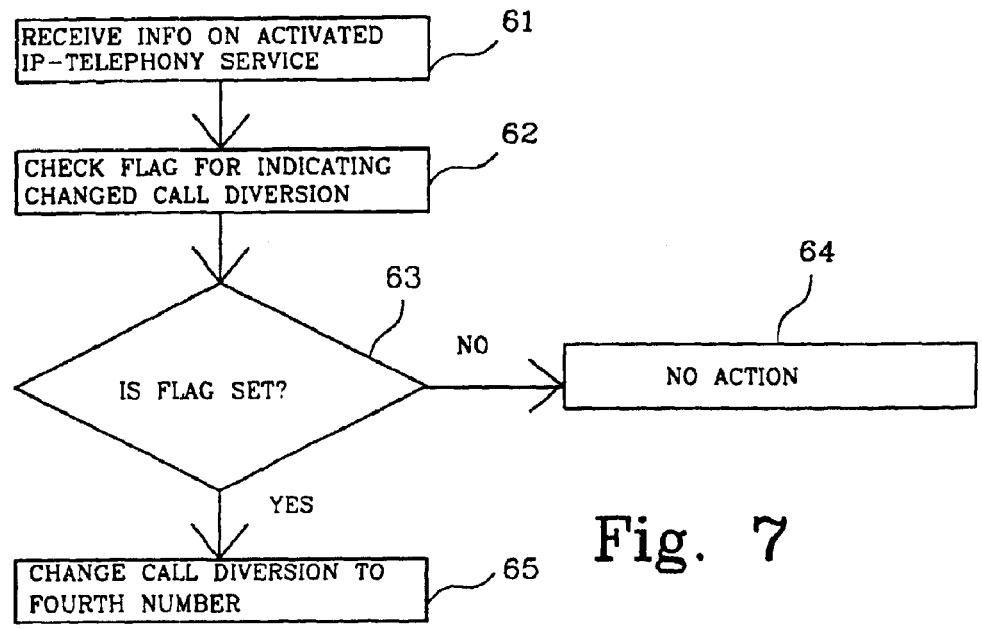
FIG. 7 and FIG. 8 are flow diagrams of an alternative embodiment of a method for handling call diversions according to the present invention.

As mentioned above it may, in the case when an IP-telephony service is activated some time after the establishment of the data connection, be of interest to make changes to call diversion in two steps. A first change is performed in connection with the establishment of the data connection and a second change is performed in connection with activation of the IP-telephony service. An embodiment of a method involving changing call diversions in two steps can be achieved by complementing the method steps described in FIG. 5 and FIG. 6 with method steps described in FIG. 7 and FIG. 8.

In a step 61, the exchange receives information that the IP-telephony service has been activated. The checking means then checks the flag to see if a call diversion was changed when the data connection was set up, step 62. If this was the case, step 63, the changed call diversion is again changed so that calls placed to the first extension number No(V) are diverted to the predetermined fourth extension number, step 65. If no call diversion was changed when the data connection was set up, no second change is performed when the IP-telephony service is activated, step 64.

Figure 8:
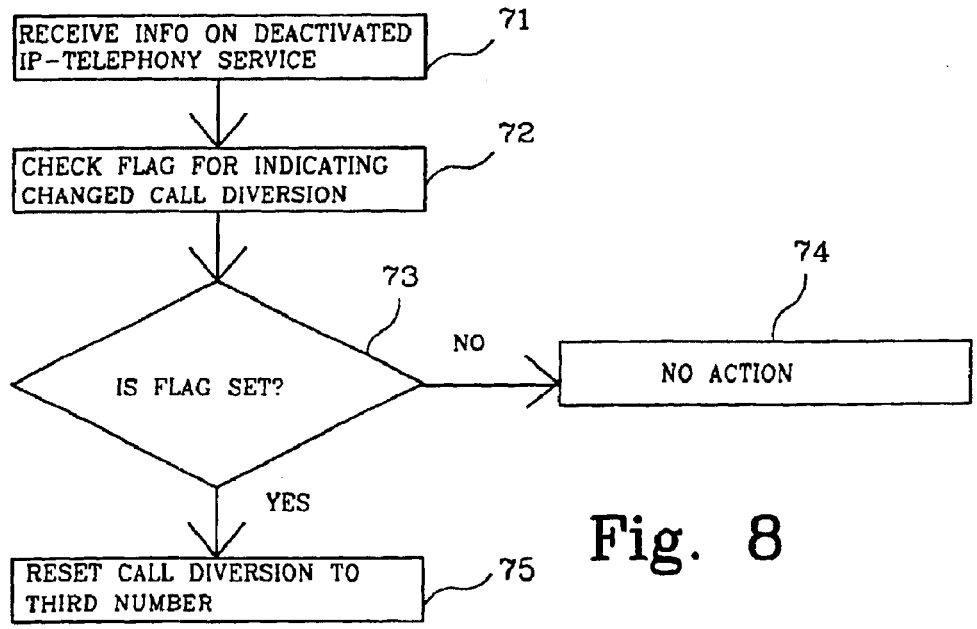

Upon deactivation of the IP-telephony service it might be preferable to perform the steps shown in FIG. 8. In step 71 the exchange receives information that the IP-telephony service has been deactivated. The checking means then checks the flag to see if a call diversion was changed when the IP-telephony service was activated, step 72. If this was the case, step 73, the twice changed call diversion is reset so that calls placed to the first extension number No(V) are diverted to the predetermined third extension number, step 75. If no call diversion was changed when the IP-telephony service was activated, no reset is performed when the IP-telephony service is deactivated, step 74.

As will be understood by the person skilled in the art, it is possible to modify the embodiment of the inventive method described above. Some examples of modifications follow. Even though it often is desirable to reset the changed call diversion when the data connection 15 is cleared, it is according to the invention possible to skip the steps 51–55, and/or the steps 71–75, involved in the reset. Another example of a modification is, as mentioned, to modify step 42 and step 43 such that the checking means not only checks for call diversions associated with extension numbers in the user profile, but checks if any of the extension numbers of the exchange are associated with a call diversion to the second extension number. Yet another example of a modification is to modify the steps 62–64 as described in FIG. 7, to check first if a call diversion has been changed, and if no such change has been made, to check if the number No(V) is currently diverted to No(A) as described in steps 43–44 of FIG. 5. If so is the case, the diversion of No(V) is changed to No(I). When the IP telephony session is discontinued, the diversion is restored to what it was before, whether it is the original diversion or the once changed diversion. Further modifications within the scope of the invention are possible and will be appreciated by the person skilled in the art.

What is claimed is:

1. A telecommunications exchange having at least one first extension number, which exchange is arranged to receive information a user has connected a computer to a data network via a dial-up data connection from a remote second extension number, wherein the exchange comprises:
   checking means for checking if calls to at least one of the at least one first extension number are diverted to the remote second extension number; and
   changing means for changing the diversion of calls to the at least one of the at least one first extension number to be directly diverted to a predetermined third extension number, instead of to the second extension number.

2. The telecommunications exchange according to claim 1, wherein the checking means are arranged to perform the check in response to the establishment of the data connection.

3. The telecommunications exchange according to claim 2, wherein the checking means are arranged to perform a second check in response to the exchange receiving a message that an application has been activated on the computer, wherein second check includes a check whether any call diversions were changed in connection with the establishment of the data connection; and wherein the changing means are arranged to again change the already changed call diversion to be diverted to a predetermined fourth extension number, instead of to the predetermined third extension number.

4. The telecommunications exchange according to claim 1, wherein the changing means further are arranged to restore the changed diversion of the calls to the at least one of the at least one first extension number, to again be diverted to the second extension number, in response to the clearing of the data connection.

5. The telecommunications exchange according to claim 1, wherein at least one of the at least one first extension number, which the checking means are arranged to check, is at least one extension number associated with the user who initiates establishment of the data connection.

6. The telecommunications exchange according to claim 1, wherein the exchange further comprises:
   means for allowing a user to determine the third predetermined extension number according to his preferences.

7. The telecommunications exchange according to claim 1, wherein the third predetermined extension number is an IP-telephony number of the exchange.

8. The telecommunications exchange according to claim 7, wherein the exchange further comprises:
   means for directing calls diverted to the IP-telephony number as IP-telephony calls on the same communications line as is used for the established data connection.

9. The telecommunications exchange according to claim 7, wherein the exchange further comprises:
   a telephony server arranged to provide the service telephony on the same communications line as is used for the established data connection, wherein the predetermined third extension number is an extension number associated with the telephony server.

10. The telecommunications exchange according to claim 7, wherein the third predetermined extension number is a mobile telephone number.

11. The telecommunications exchange according to claim 7, wherein the checking means and the changing means are software code means in an exchange control means.

12. The telecommunications exchange according to claim 7, wherein the exchange is a Private Branch Exchange (PBX).

13. A method for handling call diversions in a telecommunications exchange, which exchange has at least one first extension number, and which exchange is arranged to receive information relating to that a user has connected a computer to a data network via a dial-up data connection from a remote second extension number, the method comprising the steps of:
   checking if calls to at least one of the at least one first extension number are diverted to the remote second extension number; and
   changing the diversion of calls to the at least one of the at least one first extension number to be directly diverted to a predetermined third extension number, instead of to the second extension number.

14. The method according to claim 13, further comprising the step of:
   checking in response to the establishment of the data connection.

15. The method according to claim 14, further comprising the steps of:
   performing a second check, by the checking means, in response to the exchange receiving a message that an application has been activated on the computer, wherein the second check includes checking whether any call diversions were changed in connection with the establishment of the data connection; and
   changing again, by the changing means, the already changed call diversion to be diverted to a predetermined fourth extension number, instead of to the predetermined third extension number.

16. The method according to claim 13, further comprising the step of:

restoring the changed diversion of the calls to the at least one of the at least one first extension number, to again be diverted to the second extension number, in response to the clearing of the data connection.

17. The method according to claim 13, wherein at least one of the at least one first extension number, which the checking means are arranged to check, is at least one extension number associated with the user who initiates establishment of the data connection.

18. The method according to claim 13, further comprising the step of:

determining the third predetermined extension number according to user preferences.

19. The method according to claim 13, wherein the third predetermined extension number is an IP-telephony number of the exchange.

20. The method according to claim 19, further comprising the step of:

directing, by the exchange, calls diverted to the IP-telephony number as IP-telephony calls on the same communications line as is used for the established data connection.

21. The method according to claim 19, wherein the exchange includes a telephony server arranged to provide the service telephony on the same communications line as is used for the established data connection, and by the predetermined third extension number being an extension number associated with the telephony server.

22. The method according to claim 19, wherein the third predetermined extension number being a mobile telephone number.

23. The method according to claim 19, wherein the step of checking and the step of changing being performed in software in the exchange.

24. The method according to claim 19, wherein the exchange is a Private Branch Exchange (PBX).

* * * * *